United States Patent [19]

Tasaki et al.

[11] Patent Number: 5,343,310
[45] Date of Patent: Aug. 30, 1994

[54] PICTURE IMAGE COLOR SEPARATING APPARATUS

[75] Inventors: Koji Tasaki, Yao; Toshimitsu Asai, Osaka; Kenneth M. Jones, Yao, all of Japan

[73] Assignee: Sharp Kabushiki Kaisha, Osaka, Japan

[21] Appl. No.: 773,209

[22] Filed: Oct. 9, 1991

[30] Foreign Application Priority Data

Oct. 16, 1990 [JP] Japan .................................. 2-278513
Aug. 30, 1991 [JP] Japan .................................. 3-219693

[51] Int. Cl.$^5$ ............................................. H04N 1/46
[52] U.S. Cl. .................................... 358/515; 358/518; 358/533
[58] Field of Search ...................... 358/75, 80, 81, 316, 358/515, 518, 531, 533

[56] References Cited

U.S. PATENT DOCUMENTS 4,968,587  11/1990  Sekine .................... 430/358

FOREIGN PATENT DOCUMENTS

0320014A2  6/1989  European Pat. Off. .
0408507A1  1/1991  European Pat. Off. .
56-11455  4/1981  Japan .
59-91445  11/1984  Japan .
2-50859  3/1990  Japan .

Primary Examiner—Edward L. Coles, Sr.
Assistant Examiner—Madeleine Nguyen
Attorney, Agent, or Firm—Nixon & Vanderhye

[57] ABSTRACT

A picture image color separating apparatus to be used when block copies for dyeing use are made in a dyeing business, wherein a region the above described other representative color occupies may not exist on a straight line connecting the above described adjacent two representative color positions on the color space when the other representative color exists near the adjacent two representative colors on the original picture image from among a plurality of representative colors selected by the given procedure by the representative color selecting portion from the illustration inputted from the picture image inputting portion, whereby noises by the above described representative color are not caused on the boundary of the above described adjacent two representative colors.

5 Claims, 15 Drawing Sheets

PICTURE IMAGE COLOR SEPARATING APPARATUS

BACKGROUND OF THE INVENTION

The present invention generally relates to a picture image color separating apparatus to be used when block copies for dyeing use are made in a dyeing business.

Conventionally the following three processes are mainly required when block copies for dyeing use are made in accordance with the illustration with the use of microprocessors and so on.

(A) Illustrations are loaded in a picture image input portion such as scanner or the like and are converted into picture image data, which are more in the color number of 32 gradations about each of R (red), G (green), B (blue).

(B) Picture image data obtained by the (A) are separated into the color number of the sheets of the block copies considered property. Hereinafter such an operation is called color separation.

(C) The picture image data separated in color in such a manner as described hereinabove are outputted in block copy for each color.

The above described processes will be illustrated by way of a case where the block copies for dyeing use are made from the illustration in FIG. 2.

An illustration in FIG. 2 loaded by a scanner is converted into a picture image data of many gradations. Further, the picture image is converted into a color separating picture image with a representative color as shown in FIG. 3 by the color separation. The picture image separated into the representative colors are outputted for each of the representative colors, and such block copies as shown in FIG. 5 are outputted in accordance with the color separation picture image data.

Here the color separation of the above described (B) may be further separated into the following two processes. Namely, (B-1) Color representation is optionally selected and is determined (hereinafter referred to as color specification.)

(B-2) A picture image is separated by a representative color determined by the above description (B-1).

Such three methods as shown hereinafter are provided when the process of the above description (B-1) is embodied.

(B-1-1) Representative colors are to become particular colors (black, white, blue, red, green and so on) in spite of the color characteristics of the original picture image.

(B-1-2) The color of the original picture image is sampled so as to compose an area histogram for each color. A representative color is determined by the cluster analyzing with color difference (interval in color space) and area as evaluation elements.

(B-1-3) An operator selects a proper color with a sensory judgment so as to determine representative colors.

It is easily judged that the color error between the original picture and the color separation picture image is less in the color separation through a representative color guided by the color distribution of the picture image through the (B-1-2), instead of the color separation through the representative color fixed by the above described (B-1-1). It is possible to produce color separation picture images which are extremely reduced sensuously if an operator of the (B-1-3) optionally determines the representative color, instead of the color separation processing by the above described (B-1-2). This is the reason why the importance of each color in the whole picture image cannot be judged simply by the color area and the color difference. More concretely, the color of the background may be determined as a representative color for the reason that the area of the background is wider than the area of the most important object in the picture image in a case of the color separation processing by, for example, the (B-1-2).

Further, there are two methods as described hereinafter even when the picture image is separated through the representative colors by the above described (B-2). Namely, (B-2-1) A plurality of representative colors surrounding the color on the original picture image on the color space so as to approximately express an intermediate color by a dither method through these representative colors. (B-2-2) An interval on the color space between the color on the original picture image and the representative colors so as to convert a color into a representative color nearest in the obtained interval.

Normally the representative color obtained by the above described (B-2-1) dither method can produce a picture image less visually in different feeling as compared with the original picture image than the representative color by the shortest interval of the (B-2-2).

Since the picture image is separated into fine points when the dither method is used, resolution is lowered, and thus causing a defect in that the picture image processing after it is extremely hard to effect.

When such illustration as shown in FIG. 2 is separated in color, an operator selects a proper color from the sensory judgment, first, with the (B-1-3) so as to determine a representative color. An interval in the color space between a color on the original picture image and each representative color is computed by the (B-2-2) so as to convert the color into the representative color which is nearest in the obtained interval. Here partially enlarged views are provided in FIG. 2 through FIG. 4.

When the illustration of the original picture is clearly separated in color by a representative color as shown in FIG. 2, a picture image having a picture cell of an intermediate color is obtained on the boundary of each representative color in the reading of the illustration in the picture image input portion. Therefore, when the picture cell of the intermediate color has been separated in color, the color has to be converted into a representative color for constituting the intermediate color.

In a color space shown in FIG. 6, assume that a position on the color space of a representative color a (white) in FIG. 2 is, for example, A, and similarly, a position on the color space of a representative b (black) is B. In this case, a picture cell on the boundary between the adjacent representative color a (white) and representative color b (black) of a picture image read in the picture image input portion becomes an intermediate color positioned on a straight line connecting a position of a representative color a (white) on the color space with a position of a representative color b (black). Therefore, in the color separation, a color on a segment AB connecting a position on the color space of a representative color a (white) with a position on the color space of a representative color b (black) has to be separated in color into a representative color a (white) or a representative color b (black).

When a representative color c (read) different from the above described representative color a (white) and b (black) exists near a segment AB in the color space, a judgment error in the above described color separation appears on the boundary line of a region (closed space) to be occupied by each representative color when the color separation has been effected by the above described (B-2-2) method. Such picture image as shown in FIG. 3 is not provided as an operator intends to, thus causing such judgment error as illustrated in FIG. 4. Namely, it is found out that the same color as a representative color c (red) appears as noise on the boundary between the representative color a (white) and a representative color (black) in an enlarged view of FIG. 4. This is caused for a reason given hereinabove. Namely, as shown in FIG. 7, a region the representative color c (red) near the position of the segment AB occupies in the color space partially hangs on the segment AB. Therefore, the color of the point to be positioned on the segment AB for passing through the area the representative color c (red) occupies is separated in color into a representative color c (red) though it has to be naturally separated in color into either of the representative color a (white) and a representative color b (black). As a result, as shown in FIG. 4, noises of a representative color c (red) enter the boundary of a representative color a (white) and a representative color b (black) in the color separation picture image.

When block copies for dyeing use are made from the color separation results, an operator has to manually correct such noises one by one with the use of a painting function of a picture image processing apparatus, with a problem that operation efficiency is extremely bad because of many hours required in the correcting operation.

SUMMARY OF THE INVENTION

Accordingly, the present invention has been developed with a view to substantially eliminating the above discussed drawbacks inherent in the prior art, and has for its essential object to provide an improved picture image color separating apparatus.

Another important object of the present invention is to provide an improved picture image color separating apparatus which is free from judgment errors in the color separation, is not necessary to effect correcting operations, thus resulting in higher efficiency.

In accomplishing these and other objects, according to one preferred embodiment of the present invention, there is provided a picture image color separating apparatus for color separating into a plurality of representative colors illustrations inputted from a picture image input portion so as to produce color separating picture images, which includes, by a predetermined given method, a representative color selecting portion for selecting a plurality of representative colors from the illustrations inputted from the above described picture image inputting portion, a representative color correlated information setting portion for setting, accommodating the representative color correlated information showing positions on the color space of a representative color selected by the above described representative color selecting portion, a color separating portion for dividing into the above described respective representative colors the colors on the above described original picture image, setting so that a region the above described other representative color occupies will not exist on a straight line connecting the positions of the above described adjacent two representative colors in the setting of a region to be occupied by the above described other representative color on the color space when the other representative color exists near the adjacent two representative colors on the original picture image.

For example, when block copies and so on are made from an illustration, the illustration which becomes an original picture is inputted into a picture image inputting portion. A plurality of representative colors are selected by a given method from the above described inputted illustrations by the representative color selecting portion. Further, the representative color correlated information showing the portions on the color space of the representative colors selected by the above described representative color selecting portion is set and is accommodated into the representative color correlated information setting portion.

When the color on the original picture image is divided into the above described plurality of representative colors in accordance with the representative color selected by the above described representative color selecting portion and the above described representative color correlated information accommodated in the above described representative color correlated information setting portion, the color dividing portion operates as follows. A region the above described other representative color occupies is set so that a region the above described other representative color occupies will not exists on a straight line connecting the positions on the color space of the above described adjacent two representative colors when the other representative color exists near the adjacent two representative colors on the original picture image.

On the above described color space, a region the above described other representative color occupies does not exists on the straight line connecting the positions of the adjacent two representative colors on the above described original picture image. Between two representative colors connected (therefore, adjacent on the above described original picture image) with the straight line on the above described color space are not shown the above described other representative colors as noises.

Therefore, a color separating operation may be effected without any judgment error.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
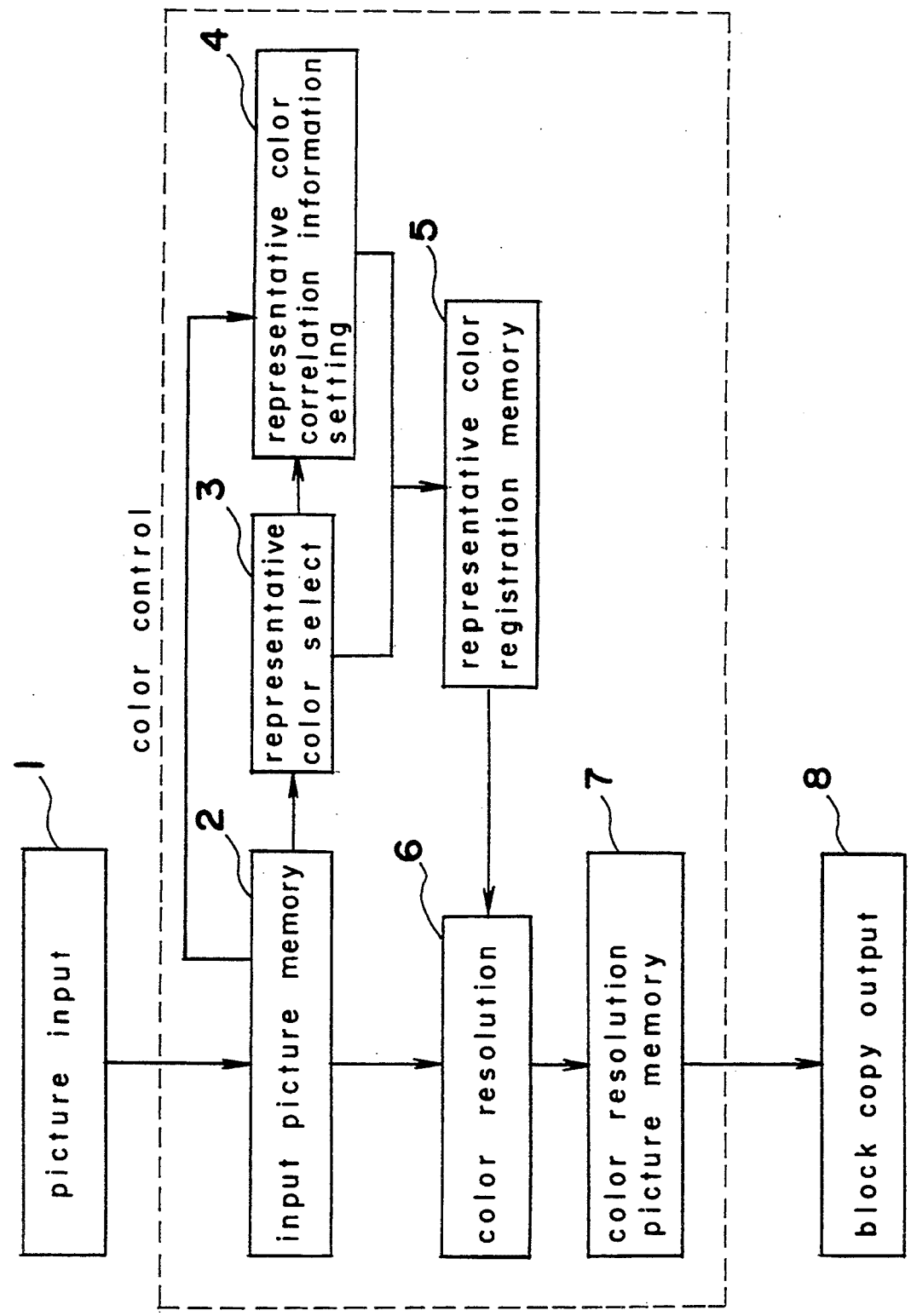
FIG. 1 is a block diagram in one embodiment of a picture image color separating apparatus of the present invention.

Before the description of the present invention proceeds, it is to be noted that like parts are designated by like reference numerals throughout the accompanying drawings.

Figure 10:
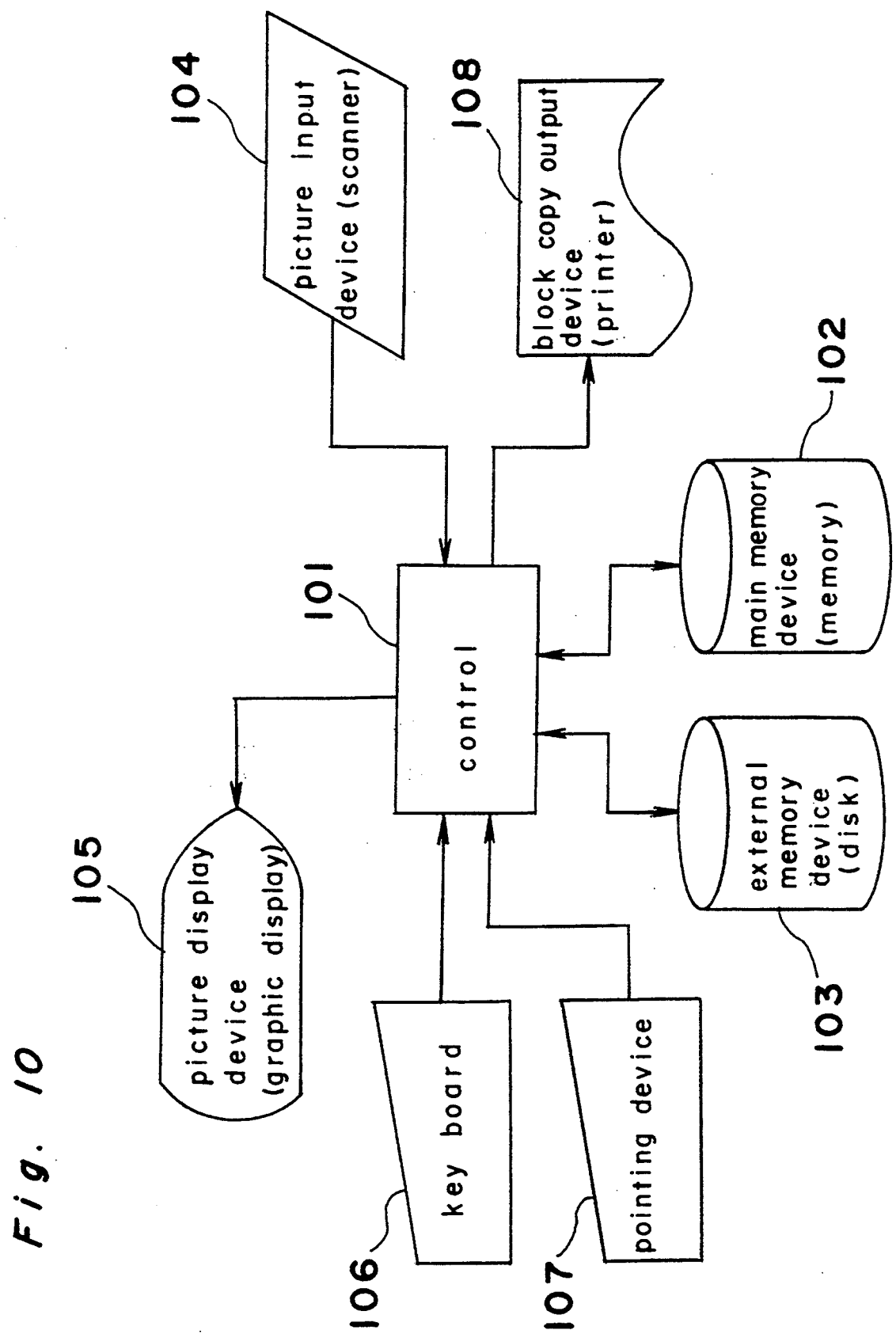
FIG. 10 is a block diagram of the construction of an apparatus.

Referring now to the drawings, there is shown in FIG. 10, the construction of a picture image color separating apparatus according to one preferred embodiment of the present invention. A main memory apparatus (102) for temporarily storing controls and picture image information during the use of an apparatus, an external memory apparatus (103) for preserving the control and the picture image information for a longer period of time, a picture image input apparatus (104) for inputting the picture image information on the original picture into the apparatus, a picture image displaying apparatus (105) for displaying the picture image information with colors visible to human eyes, a keyboard (107) for inputting letters, language information, a pointing device (107) for inputting the coordinate information on the plane, and a printer (108) for printing, outputting the picture image information on paper or film are connected with a control portion (101) as a center, so that input, output of the information and processing of the information may may be effected among the respective input, output appliances.

Figure 11:
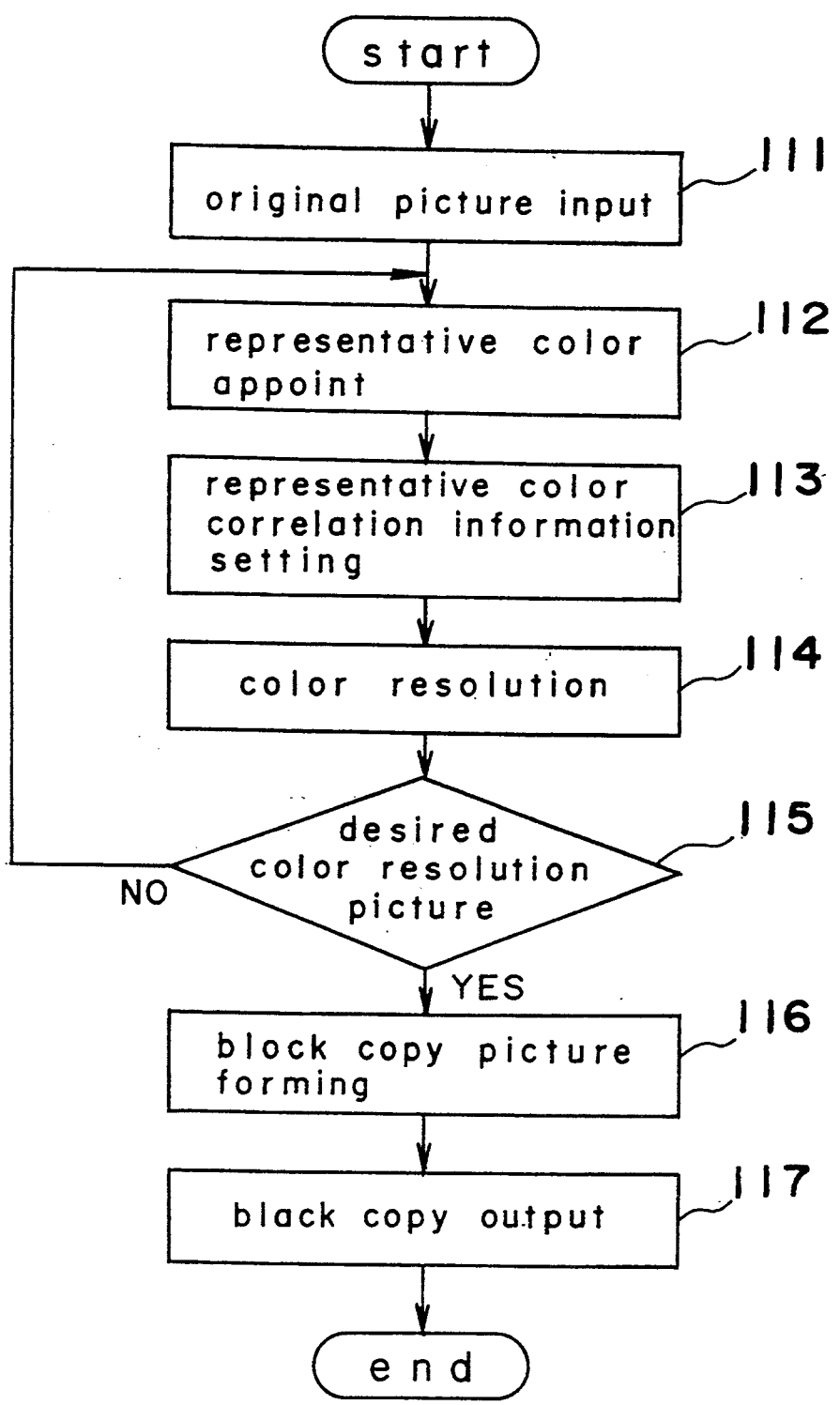
FIG. 11 is a flow chart of making block copies.

The summary of a step of making block copies in accordance with the original picture with the use of the apparatus will be described with reference to a flow chart of FIG. 11.

First, the picture image information on the original picture is inputted so as to effect an original picture image input step (111) for making the picture image data, displaying them on a picture image display apparatus.

A representative color specifying step (112) for specifying a representative color, a representative color correlated information setting step (113) for setting the correlated information among the respective representative colors specified at the representative color specifying step are effected.

A color separating step (114) for separating in color picture image data made at the original picture image input step in accordance with information specified at the representative color specifying step and the representative color correlated information setting step is effected so as to make an color separating picture image and display the color separating picture image on the color image display apparatus.

At this time point, the color separation picture image is confirmed so as to rerun from the representative color specifying step when the picture image is not the color separating picture image as desired. (115)

In a case of such a color separation picture image as desired, a block copy output step (116) for making picture copy picture images in accordance with the color separation picture image.

The block copy picture image is outputted by a printer so as to obtain the block copy. (block copy output step 117).

The respective steps described hereinabove will be described hereinafter in more detail.

Figure 12:
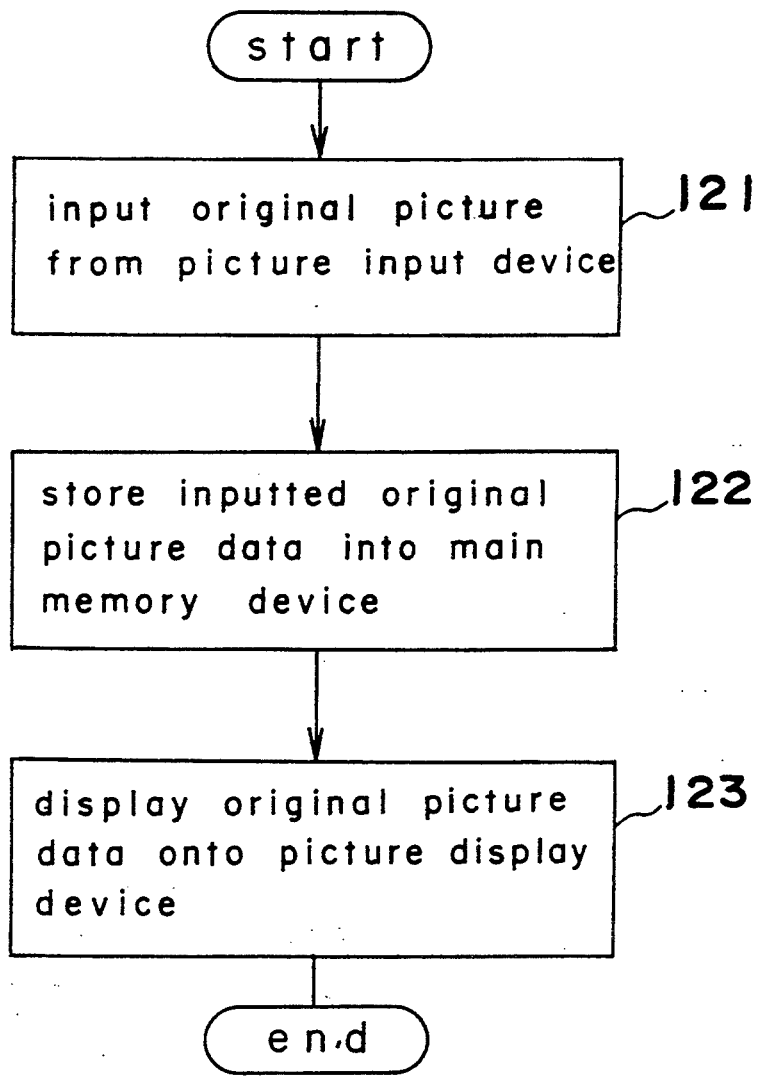
FIG. 12 is a flow chart of an origin picture image input step (111)

An original picture image input step (111) will be described in further detail with the use of FIG. 12.

Original picture image data represented with electric signals, in accordance with the picture image represented with colors on the original picture by the use of the picture image input apparatus (104), are made (121).

The original picture image data are stored (122) in the main memory apparatus (102).

Figure 13:
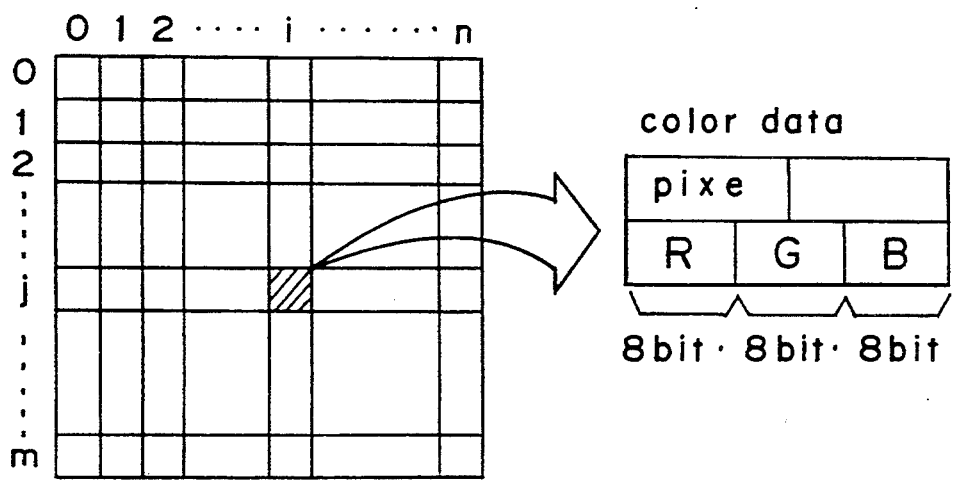
FIG. 13 is a memory form of the original picture image data within a main memory apparatus.

A memory form of an origin picture image data within the main memory apparatus is shown in FIG. 13.

The original picture image data are extensive two-dimensional arrangement with color data as elements. One color data represents one color and corresponds to one picture element on the picture image. Each color data is composed of three data of red, green, blue. Each data of red, green, blue are unsigned integers to be expressed respectively with 8 bits, and is an either integer of 0 through 255. The color data wholly expresses one coordinate within RGB color space (color space of addition mixed color with red, green, blue being provided as a coordinate axis). In other words, the color data expresses one color from among approximately 16,700,000 colors.

The original picture image data are displayed (123) on the picture image display apparatus. An operator may visually recognize as picture image images picture image data made at the original picture image input step.

Figure 14:
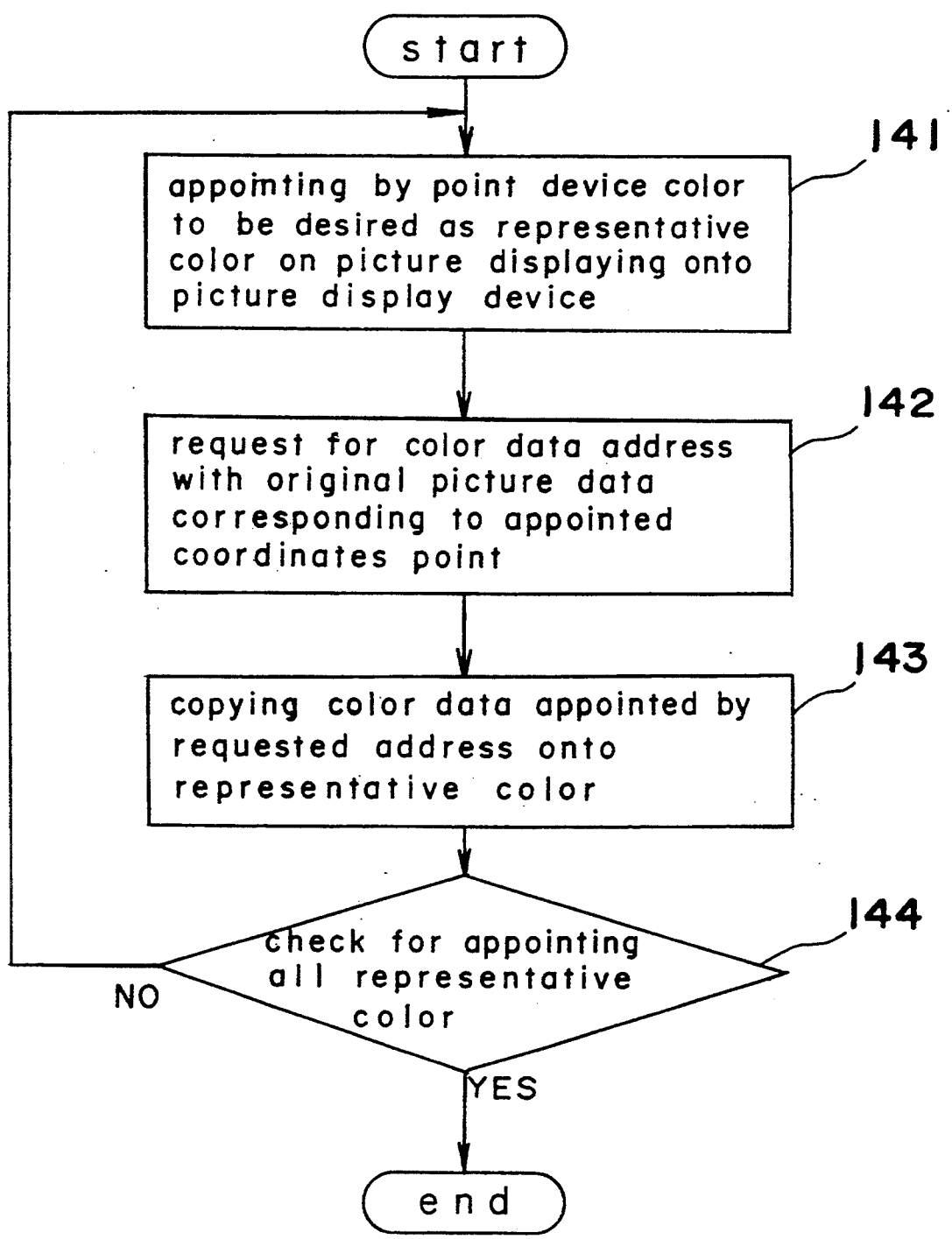
FIG. 14 is a representative color specifying step.

A representative color specifying step (112) will be described in detail with the use of FIG. 14.

A representative color data is recorded in the main memory apparatus (102).

The form of the representative color data is composed of numerals (id) for identifying a color data showing one color (coordinates within the color space) the same as the color data, and the other representative color data of the representative color data.

The representative specifying step is to substitute a value, desired by an operator, into the representative color data.

The operator selects from his sensory judgement a color which is desired to become a representative color on the picture image displayed on the image display apparatus (105) so as to specify (141) it with a pointing device (107).

A color data address (position on two-dimensional arrangement), which is one of the elements of the original picture image data corresponding to picture elements specified by the pointing device, is computed (142).

A color data shown by an obtained address is copied on the representative color data (143). At this time, a numeral (id) is assigned to a representative color data. The numeral (id) is assigned not to be overlapped on the number (id) of the other representative color. Therefore, it is possible to retrieve one representative color corresponding from the numeral.

From the processing of the (141) through (143), one representative color data is specified.

By repetition of the processing from the (141) to the (143), a plurality of representative colors are specified (144).

Figure 2:
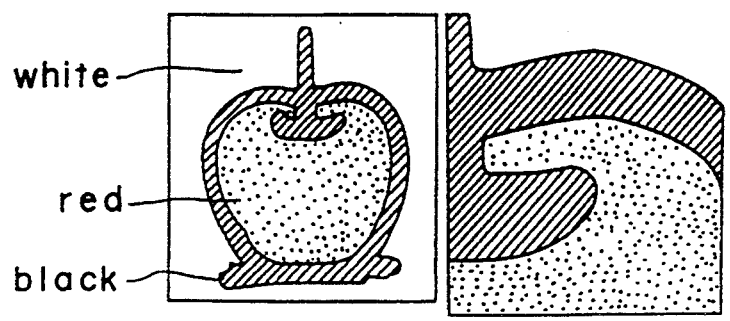
FIG. 2 is a view showing one example of an original picture illustration.

In an concrete example of an original picture shown in FIG. 2, an operator specifies three points on the original picture image, three points of illustrated white, black, red so as to register them in the representative color data as a representative color a, a representative color b, a representative color c.

A representative color correlated information setting step (113) will be described with the use of the data block diagram of FIG. 15 and a flow chart of FIG. 16.

Figure 15:
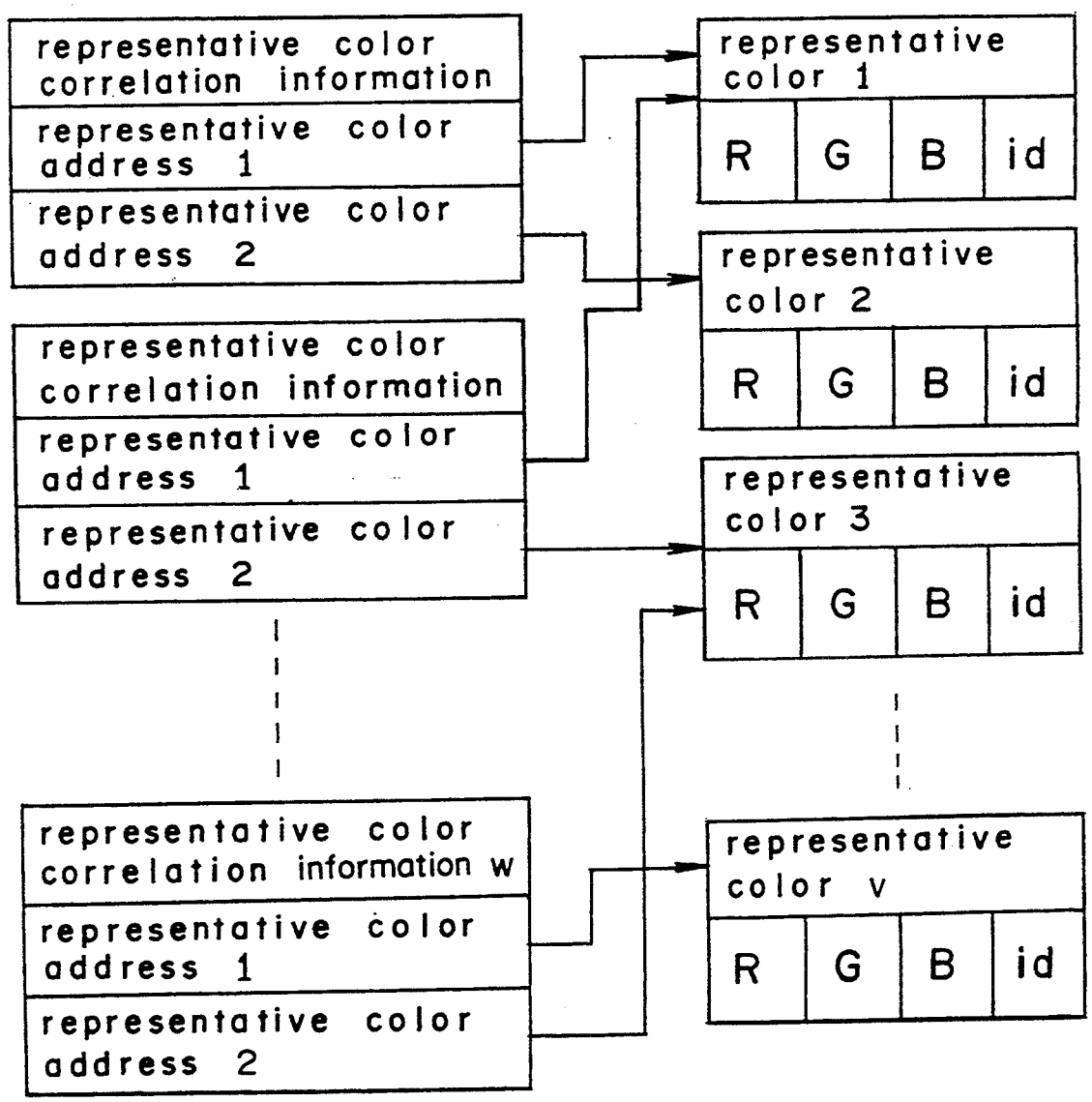
FIG. 15 is a block diagram of a representative color data and a representative color correlated information data.

FIG. 15 illustrates the structure of the representative data and the representative color correlated information data as a model. All these data are recorded in the main memory apparatus (102).

The representative color data show color space coordinates. An operator optionally specifies a plurality of them in the representative color specifying step (113), with m numbers existing from a representative color 1 to a representative color m.

Figure 20:
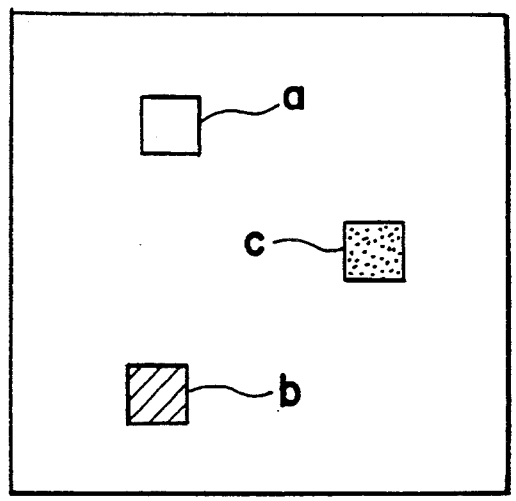
FIG. 20 is a model view of representative color symbols represented on a picture image display apparatus.

Three symbols of a representative color a, a representative color b, a representative color c are displayed with an original picture shown in FIG. 2 being in a concrete example. A model of the display is shown in FIG. 20.

Representative color correlated information is data expressing whether or not these representative colors are adjacent on the picture image. The representative color correlated information has two addresses to the representative colors. The two addresses are called a representative color address 1 and a representative address 2. One piece of representative color correlated information shows that a representative color to be shown with a representative address 1 and a representative color to be shown with a representative address 2 are adjacent on the original picture image. Also, the representative color correlated information may also exist by plurality.

A representative color correlated information setting step is one for setting optional representative color correlated information an operator desires.

Figure 16:
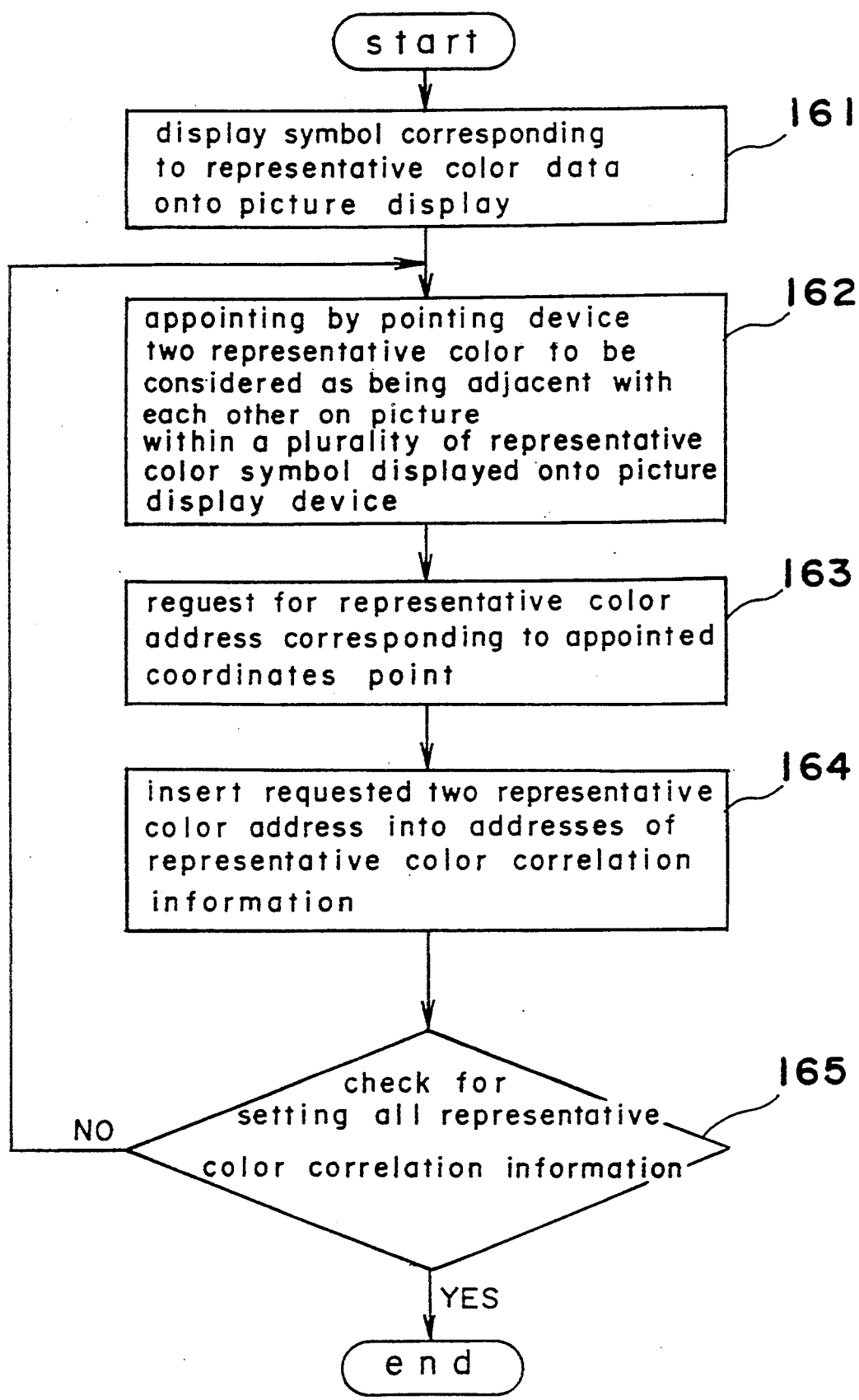
FIG. 16 is a detailed flow chart of a representative color correlated information setting step.

FIG. 16 is a detailed flow chart of a representative color correlated information setting step.

First, a representative color symbol corresponding to a representative color data is displayed on a picture image display apparatus (105). One representative color symbol corresponds to one representative color data. When m number of representative color data exist, m number of representative color symbols are displayed (161).

An operator judges whether or not respective representative colors specified at the representative color specifying step are adjacent to each other on the original picture image so as to sequentially specify (162) symbols, showing two representative colors judged adjacent, with a point device (107).

Addresses of representative colors corresponding to two coordinate points specified with a pointing device are obtained (163) so as to substitute (164) them two addresses, to the representative colors, of the representative color correlated information.

One representative color correlated information has been set by a step of the (164) from the (162). By the repetition of a step from the (162) to the (164), a plurality of representative color correlated information is specified (165).

Figure 8:
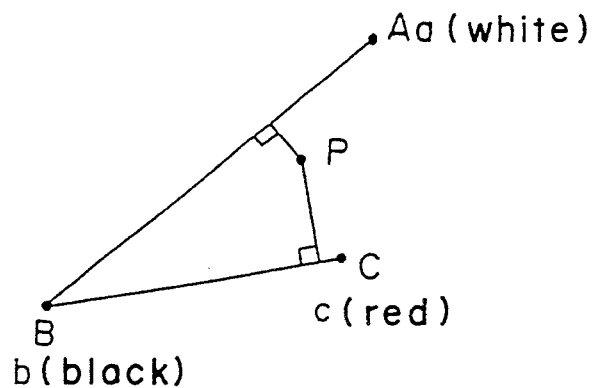
FIG. 8 is a view for illustrating interval calculation on the color space.
Figure 21:
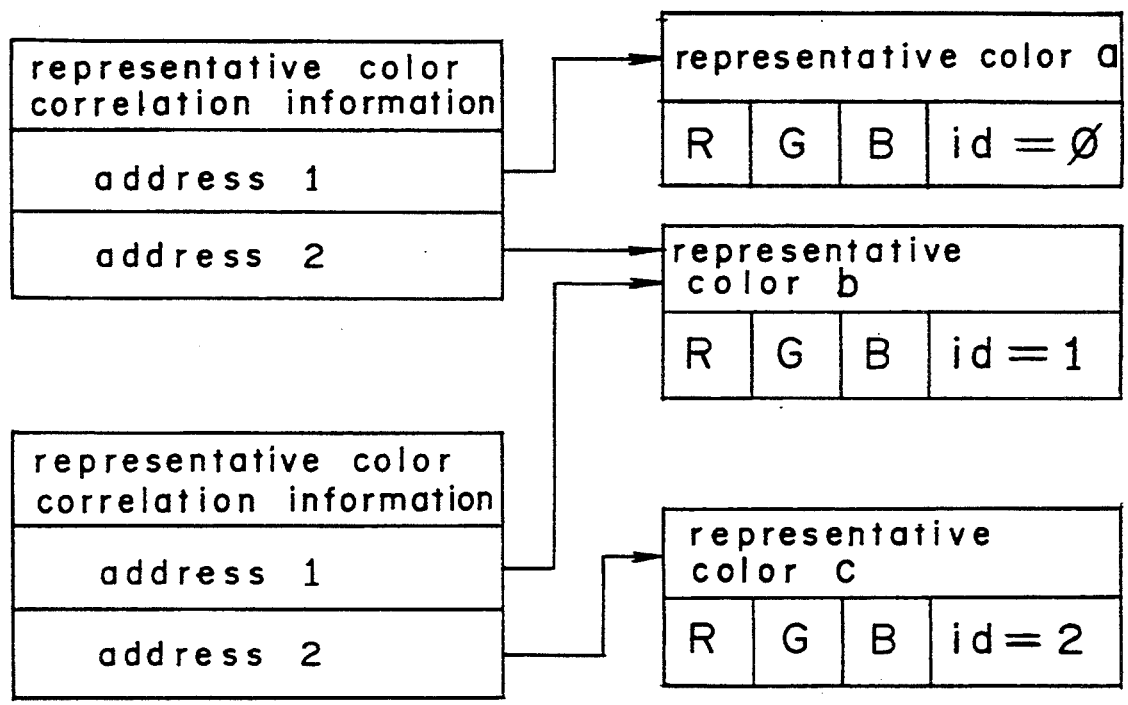
FIG. 21 is a representative color data structure in a concrete embodiment.

In an concrete example of an original picture shown in FIG. 2, a representative color a is in contact with a representative color b, a representative color b a representative color c on the original picture image, so that a symbol of a representative color a and a symbol of a representative color b, a symbol of a representative color b and a symbol of a representative color c have been sequentially specified. The representative color data at this time and the data structure of the representative color correlated information are shown in FIG. 21. The data structure is expressed as positions in the color space as shown in FIG. 8.

A color separation picture image is made with the original picture image data made in the original picture image input step (111) with reference to representative colors and representative color correlated information specified by the representative color specifying step (112) and the representative color correlated information setting step (113). This is called a color separation step (114).

Figure 17:
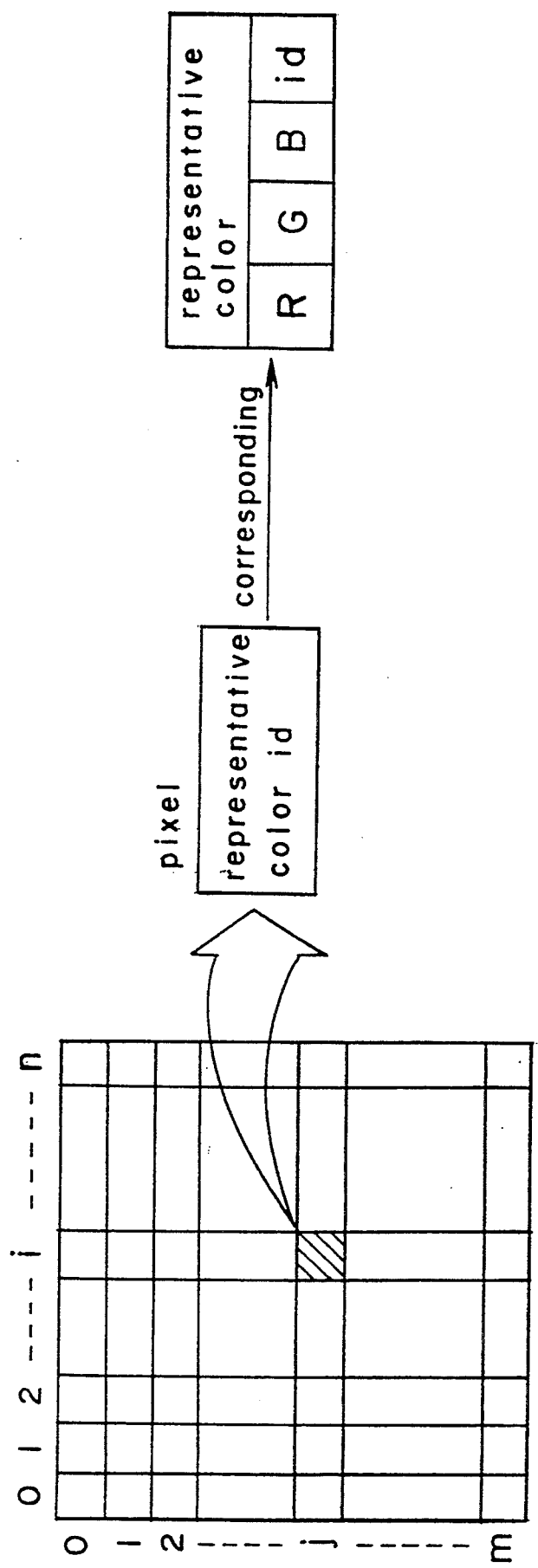
FIG. 17 is a data format of a color separation picture image.

A data format of the color separation picture image is shown in FIG. 17.

The color separation picture data are in extensive two-dimensional arrangement with a representative color id being an element. The number of longitudinal, lateral elements is the same as that of the original picture image data, and one element of the original picture image data, namely, one picture element of the original picture images corresponds to a representative color id which is an element of the color separation picture element as it is.

A representative color id which is an element of the color separation picture image corresponds to one representative color data, and it is shown that a picture element corresponding to one element in the two-dimensional arrangement is in a region of a representative color corresponding to the representative color id.

A color separating step is one of determining a representative color id, which is an element of a corresponding color separation picture image data, from the color data that is an element of the original picture image data. The step is effected with respect to all the picture elements so as to complete the color separation picture image data.

Figure 18:
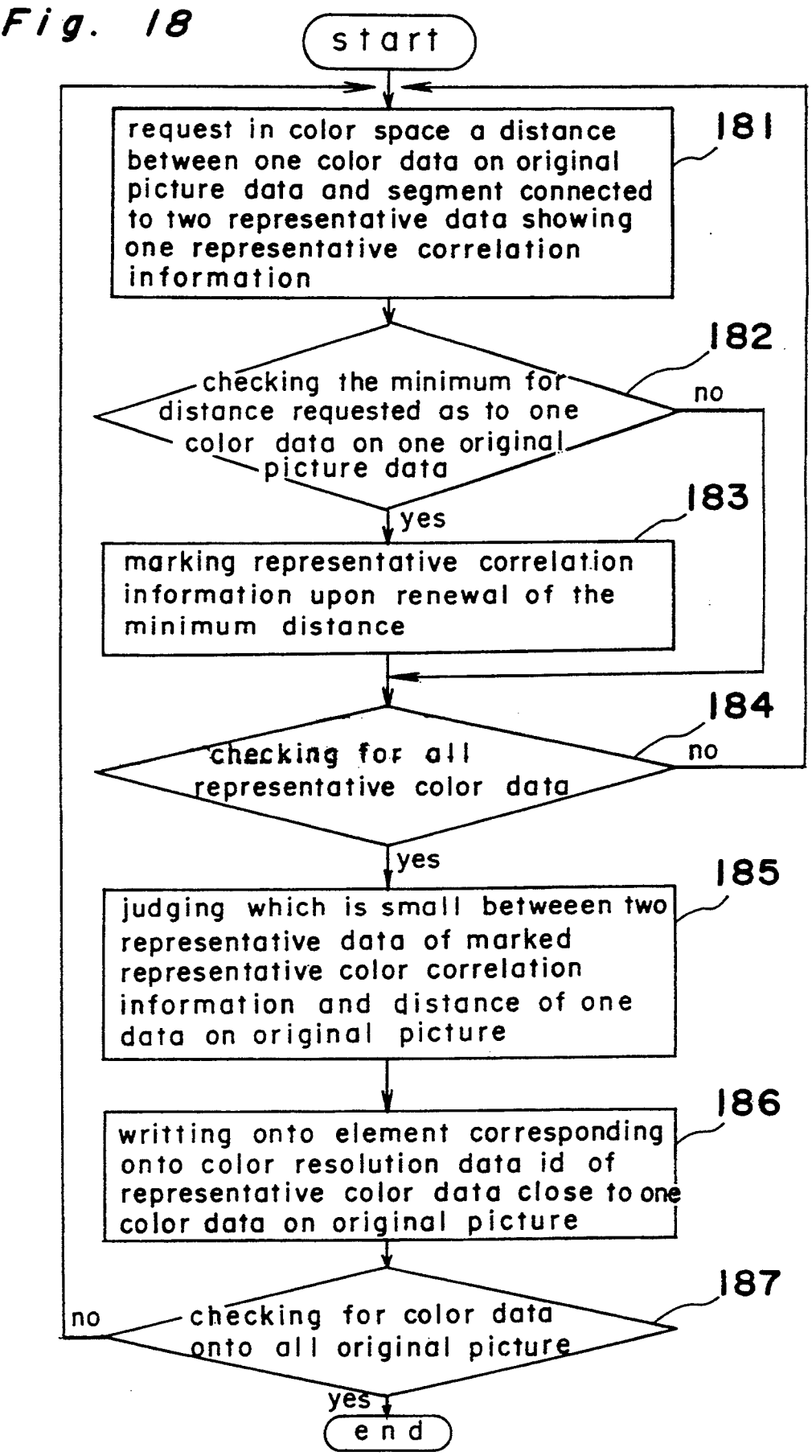
FIG. 18 is a flow chart of a color separation step.

A color separation step will be described in detail with the use of a flow chart of FIG. 18.

An interval in the color space of a segment connecting one color data on the original picture image with two representative color data showing one representative color correlated information (181).

Concretely the following calculation formula is used.

Assume that an coordinate in the color space of one data on the original picture image is P. Coordinates in the color space of two representative color data showing one representative color correlated information are assumed A, B. Further, $$Q = B - A$$

$$R = A - P$$

A vector to a point on a segment AB from P is expressed by $$Qn + R$$

where n is an optional constant which is $0 \leq n \leq 1$. An interval m to a point P on the segment AB from P becomes $$\begin{aligned} m^2 &= |Qn + R|^2 \\ &= in^2 + 2jn + k \end{aligned}$$

where
$i = Q^2$
$j = QR$
$k = R^2$
are defined.

Namely, $m^2$ is a quadratic equation as to n. Therefore, the interval between a segment AB and a point P is a minimum value of m in $0 \leq n \leq 1$. The minimum value of m is different by the n coordinate value of a vertex of the quadratic equation as to n.

Assume that $d = -i / j$, the square of an interval between a segment AB and a point P, namely, of m by the following three matters may be obtained as (a) $m^2 = k$ when $d < 0$ (b) $m^2 = id + 2jd + k$ when $0 \leq d \leq 1$ (c) $m^2 = i + 2j + k$ when $1 \leq d$ Through comparison between a newly obtained interval and a minimum interval obtained so far with respect to a representative color correlated information about one color data P on the original picture image (182), the interval is stored as a minimum interval given so far when the newly obtained interval is smaller. Also, an address to the representative color correlated information calculating the minimum interval is stored (183).

When the newly obtained interval is an initial one about one color data P on the original picture image, the newly obtained interval becomes a minimum interval given so far, because the minimum interval given so far does not exit.

By the repetition (184) of a step from the (181) to the (183) about all the representative color correlated information, the representative color correlated information nearest in interval may be found about one color data P on the original picture image.

An smaller interval between two representative colors shown by the shortest representative color correlated information and one color data on the original picture image is judged (185) about one color data P on the original picture image.

Concretely, this is judged by the value of d. P is closer to B than to A when $d < 0.5$. P is closer to A than to B when $d > 0.5$.

A numeral (id) of a nearer representative color data computed in this manner is substituted into the element of the color separating picture image data corresponding to one color data P on the original picture image (186).

An element of a color separation picture image data corresponding to one element on the original picture image data is obtained by a step of the (181) through the (186).

In an example shown in FIG. 8, a point P is closer to a segment AB than to a segment BC, and to closer to a point A than a point B, so that the number becomes one of a representative color a in the color separation picture image data.

Figure 4:
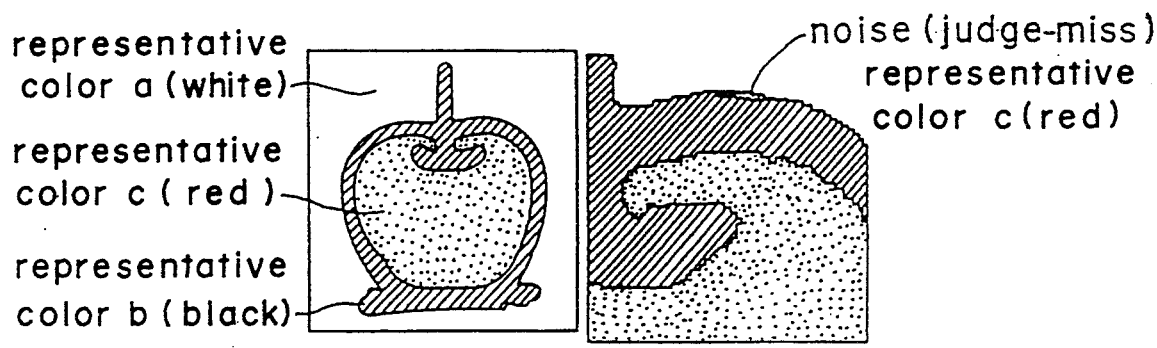
FIG. 4 is a view showing one example of a color separating picture image when noises have been caused without any correct color separation in accordance with a second illustration.
Figure 9:
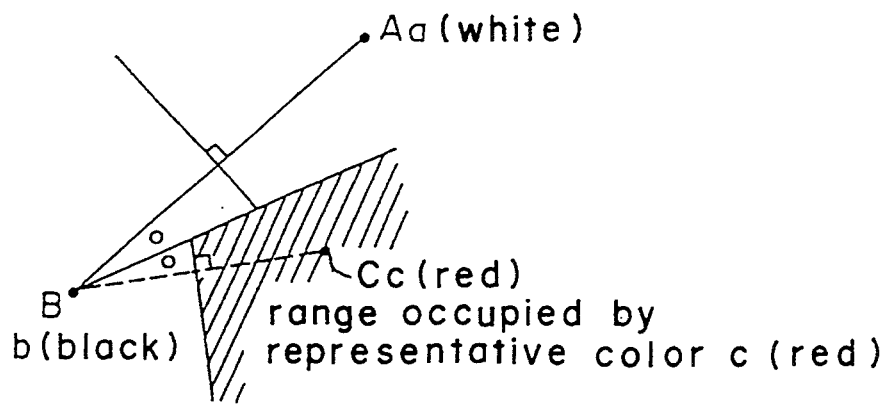
FIG. 9 is a view showing one example of a region to be occupied by a representative color c on the color space in accordance with FIG. 8.

A region to be occupied in the color space of the representative color c to be obtained by the above described color separating method is shown in FIG. 9. From the drawing, it is found out that a region to be occupied by a representative color c does not exit on the segment AB. Therefore, in this case, an intermediate color of a representative color a and a representative color b is separated in color without fail into a representative color a or a representative color b, but is not separated in color into a representative color c. As shown in FIG. 4, it shows that noises of a representative color c do not enter with respect to a representative color a in contact with a representative color b on the color separating picture image.

By the repetition of a step of the (181) through the (186) with respect to a color data which are elements on all the original picture images, the color separating picture image is completed (187).

Figure 3:
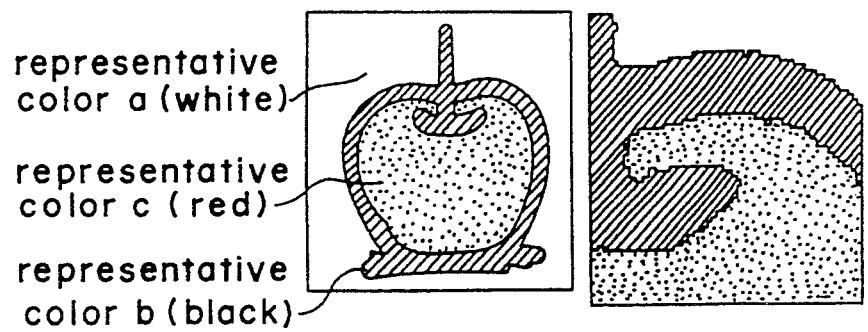
FIG. 3 is a view showing one example of a color separation picture image in the correct color separating operation in accordance with an illustration of FIG. 2.

A color separating picture image example in accordance with original picture shown in FIG. 2 will be shown in FIG. 3.

Figure 19:
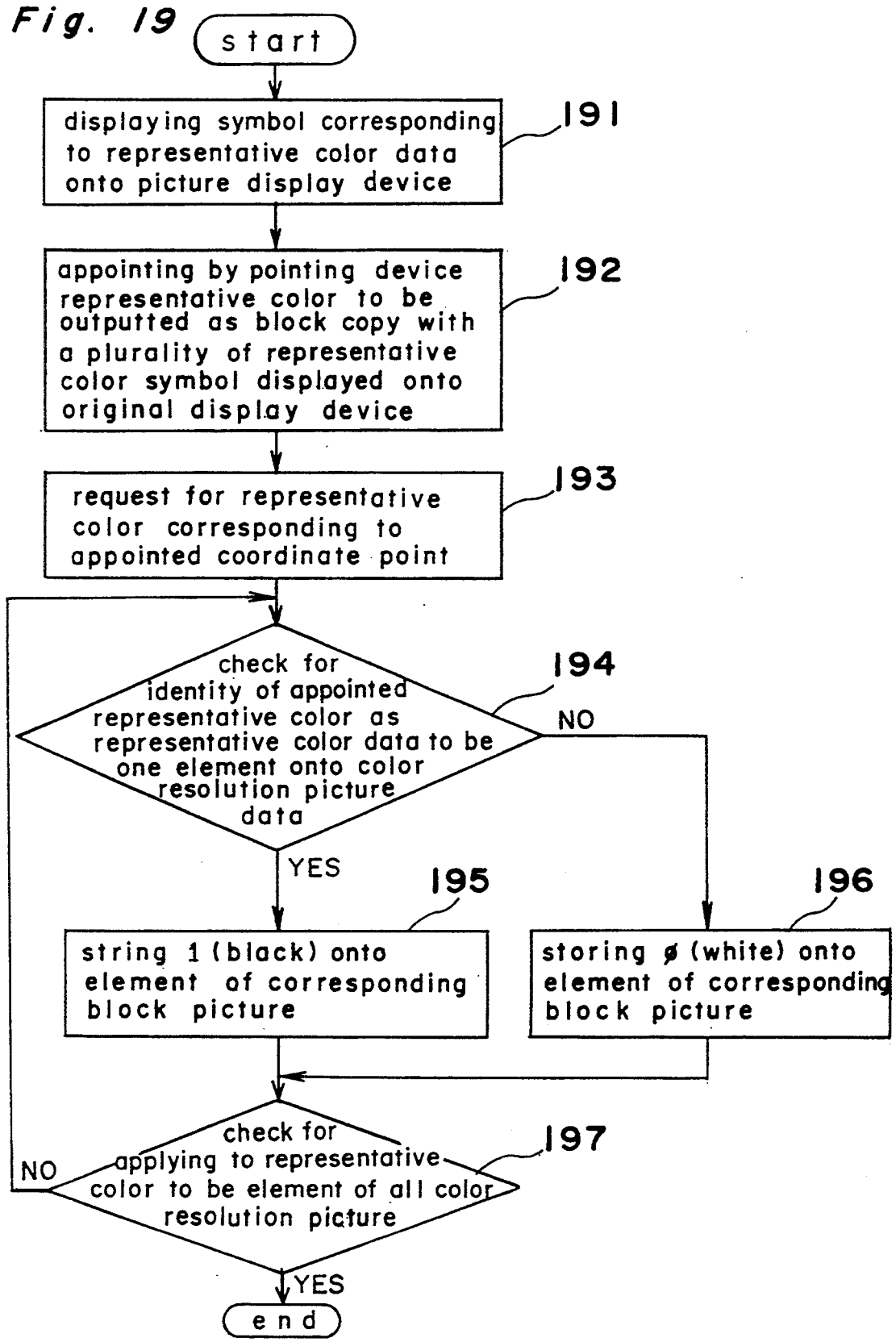
FIG. 19 is a flow chart of a block copy picture image making step (116)

A block copy picture image making step (116) will be described in detail with the use of a flow chart of FIG. 19. The block copy picture image making step is one of making the block copy picture image data from the color separating picture image made by a color separating step (115).

The block copy picture image data is an extensive two-dimensional arrangement with data of one bit showing 0 through 1 being an element. Number of longitudinal, lateral elements is the same as that of a color separating picture image. One element of the color separation picture image data, namely, a representative color id corresponds to the data of one bit of the block copy picture image. The one bit data shows a block picture element when it is one, a white picture element when it is 0, (white, black may be reversibly defined), the block copy picture image data wholly shows a picture image composed of two colors, white and black.

To begin with, as in the representative color setting step, a representative color symbol corresponding to a representative data is displayed in the picture image display apparatus (105). One representative color symbol corresponds to one representative color data. When v number of representative color data exits, v number of representative color symbols are shown (191).

An operator specifies (192) a symbol of a representative color data, which is desired to be outputted black, with a pointing device (107).

An address of a representative color corresponding to a coordinate point specified with the pointing device is obtained (193) so as to store the id thereof.

It is judged (194) whether the color is the same as the representative color specified by an operator about the representative color numerals which are all the elements of the color separating picture image. When the color is the same, 1 (black) is stored in the element of the corresponding block copy picture image data. When the color is different, 0 (white) is stored (196).

The processing from the (194) to the (196) is effected about the elements of all the color separating picture image so as to complete the block copy picture image data.

Figure 5:
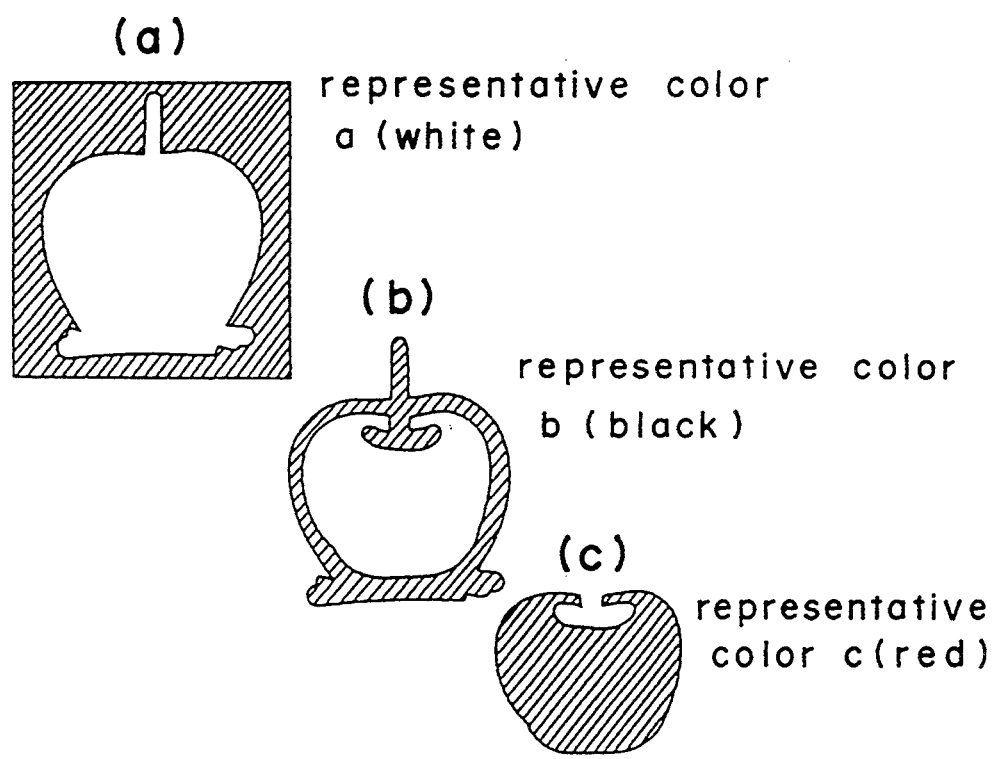
FIGS. 5(a-c) are a view showing one example of a block copy made in accordance with FIG. 3.
Figure 6:
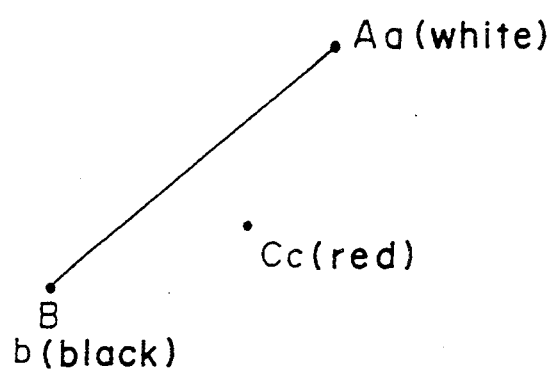
FIG. 6 is a view for illustrating of color space.
Figure 7:
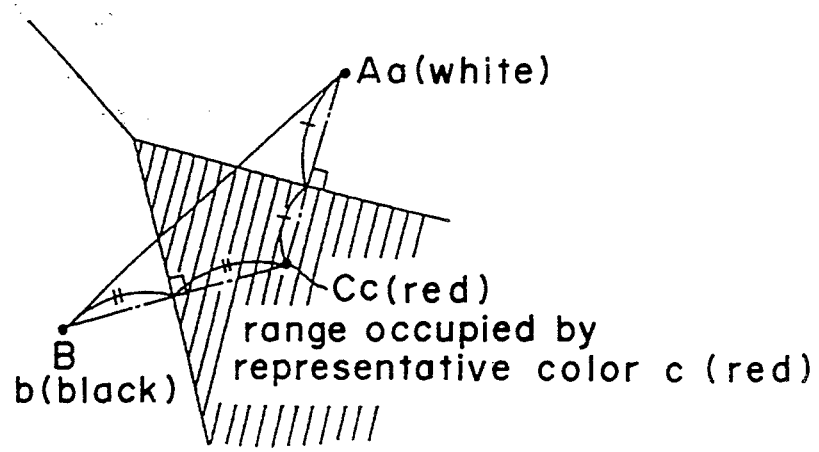
FIG. 7 is an illustrating view on the color space about noises of FIG. 4.

A block copy picture image data example in accordance with the color separating picture image shown in FIG. 3 is shogun in FIG. 5. FIG. 5 shows three block copy picture image data when one from three symbols, a, b, c, has been picked.

The block copy output step is one of printing on film or paper in accordance with a block copy picture image so as to make a block copy.

First, a block copy picture image data is fed to a block copy output apparatus (108). The block copy output apparatus effects the processing of exposing the films, spraying printing ink on the paper, and so on so as to make, output the block copy.

After the above described steps in accordance with the original pictures, the present apparatus can make the block copy.

As a region the other representative color occupies is adapted not to exist between straight lines connecting two points on color space showing two representative colors to be connected on the original picture image in the counting of the interval between a color and each representative color on the original picture image on the color space in the color separation of the present embodiment, judgment errors may be removed in the color separating operation.

As shown in FIG. 4, in the color separation picture image data which becomes original when the block copy is made, other representative colors do not appear as noises between two adjacent representative colors. Accordingly, when block copies for dyeing use are made from the results of the color separation, operation efficiency may be very improved, because an operator is not required to effect manual corrections.

Although the selecting operation is effected by an operator's sensory judgment in the obtaining of the representative color in the above described embodiment, the invention is not restricted to it.

An algorithm of the color separation to be effected by a color separation portion 6 in the above described embodiment is not restricted to the above description. The algorithm has only to be one where a region the other representative color occupies may not enter onto a line connecting the mutually connecting two representative colors in the counting of the interval on the color space between the color and the respective representative colors on the original picture image.

In the above described embodiment, three colors of a (white), b (black), c (red) have been illustrated as representative colors. In the present invention, representative colors of four colors or more may be used.

As is clear from the foregoing description, according to the picture image color separation apparatus of the present invention, a region the above described other representative color occupies may not exist on a straight line connecting the above described adjacent two representative color positions on the color space when the other representative color exists near the adjacent two representative colors on the original picture image from among a plurality of representative colors selected by the given procedure by the representative color selecting portion from the illustration inputted from the picture image inputting portion. Therefore, a region the above described other representative color occupies does not exist on the straight line connecting the positions of two representative colors on the above described color space. On the above described color separation picture image, noises by the above described representative color are not caused on the boundary of the above described adjacent two representative colors.

Therefore, the present invention provides a highly efficient picture image color separating apparatus, which is free from judgment errors, is not required to effect an correcting operation and so on in the color separation by the picture image color separating apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A picture image color separating apparatus for separating colors in an original picture image into a plurality of representative colors to produce color separated picture images, said apparatus comprising: a representative color selecting means for selecting a plurality of selected representative colors for said picture image a representative color correlated information means for determining representative color correlated information data identifying areas on color space for each of said selected representative colors;

a color separating means for correlating the colors on said original picture image to corresponding colors of said selected representative colors; wherein in said representative color correlated information means allocates an area in color space to each of said representative colors such that said area does not include a straight line segment connecting an adjacent two other representative colors on the color space when the representative color is near the adjacent two other representative colors on the original picture image.

2. The picture image color separating apparatus as defined in claim 1, further comprising a block copy generation means for generating block copies formed of said representative colors and said block copies are of said original picture image.

3. The picture image color separating apparatus as defined in claim 1, wherein said area for a representative color does not include a straight line segment connecting the positions on the color space of the adjacent two other representative colors when the representative color exists near the adjacent two other representative colors on the original picture image.

4. The picture image color separating apparatus as defined in claim 1, wherein said color separating means applies an algorithm to effect color separation such that said area for the representative color avoids the line segment connecting two other representative colors by determining the interval on the color space between a color and the respective representative colors on the original picture image.

5. The picture image color separating apparatus as defined in claim 1, wherein the area occupied by a representative color avoids a straight line segment connecting the adjacent two other representative colors on the color space when the representative color exists near the adjacent two other representative colors on the original picture image.

* * * * *